US008997918B2

(12) United States Patent
Nordberg

(10) Patent No.: US 8,997,918 B2
(45) Date of Patent: Apr. 7, 2015

(54) PROTECTIVE DEVICE FOR AN ARTICULATED VEHICLE

(75) Inventor: Björn Nordberg, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 0 days.

(21) Appl. No.: 13/497,228

(22) PCT Filed: Sep. 17, 2010

(86) PCT No.: PCT/SE2010/050997
§ 371 (c)(1),
(2), (4) Date: Mar. 20, 2012

(87) PCT Pub. No.: WO2011/037521
PCT Pub. Date: Mar. 31, 2011

(65) Prior Publication Data
US 2012/0187659 A1 Jul. 26, 2012

(30) Foreign Application Priority Data

Sep. 24, 2009 (SE) .................................. 0950697

(51) Int. Cl.
B62D 13/02 (2006.01)
B62D 12/00 (2006.01)
(Continued)

(52) U.S. Cl.
CPC .............. B62D 12/00 (2013.01); F41H 5/007 (2013.01); F41H 7/04 (2013.01); B62D 55/0655 (2013.01)

(58) Field of Classification Search
USPC .................. 180/418, 419, 420, 9.4, 9.42; 280/446.1, 432, 474
See application file for complete search history.

(56) References Cited

U.S. PATENT DOCUMENTS 3,215,219 A 11/1965 Forsyth et al.
4,756,543 A * 7/1988 Cromnow et al. ............ 280/432
(Continued)

FOREIGN PATENT DOCUMENTS

EP 2085299 A2 8/2009
JP 50-110002 U 9/1975
(Continued)

OTHER PUBLICATIONS

International Search Report and Written Opinion received for PCT Patent Application No. PCT/SE2010/050997, mailed on Dec. 23, 2010, 10 pages.
(Continued)

Primary Examiner — Anne Marie Boehler
Assistant Examiner — Marlon Arce
(74) Attorney, Agent, or Firm — Morrison & Foerster LLP

(57) ABSTRACT

The invention relates to protective device for an articulated vehicle (1) comprising at least a first and second vehicle portion (4, 6); a control gear (8) connected to the respective vehicle portion (4, 6); and an actuating member (16) for, via the control gear (8), changing the relative position of the vehicle portions (4, 6) in relation to one another. The protective device (2) comprises at least one stiffening means (22), which fixes the position of each respective vehicle portion (4, 6) in relation to one another whenever the acceleration and/or speed of at least one of the vehicle portions (4, 6) exceeds a predetermined limit value. The invention also relates to a method for controlling a stiffening means of such a protective device (2) for an articulated vehicle (1).

16 Claims, 7 Drawing Sheets

(51) Int. Cl.
*F41H 5/007* (2006.01)
*F41H 7/04* (2006.01)
*B62D 55/065* (2006.01)

(56) References Cited

U.S. PATENT DOCUMENTS

| | | | |
|---|---|---|---|
| 6,581,718 B1* | 6/2003 | Vigren et al. | 180/420 |
| 7,354,056 B2* | 4/2008 | Namuduri et al. | 280/455.1 |
| 7,389,847 B2* | 6/2008 | Sakikawa | 180/418 |
| 7,464,955 B2* | 12/2008 | Ahlberg et al. | 280/474 |
| 7,770,909 B2* | 8/2010 | Anderson et al. | 280/432 |
| 7,963,547 B2* | 6/2011 | Anderson | 280/683 |
| 2008/0041655 A1* | 2/2008 | Breiner et al. | 180/418 |
| 2008/0210485 A1* | 9/2008 | Vigholm et al. | 180/418 |

FOREIGN PATENT DOCUMENTS

| | | |
|---|---|---|
| SE | 444981 B | 5/1986 |
| WO | WO-00/35735 | 6/2000 |
| WO | 03/055735 A1 | 7/2003 |
| WO | 2007/013990 A1 | 2/2007 |

OTHER PUBLICATIONS

Search Report and Written Opinion received for Singapore Patent Application No. 201201013-8, mailed on Jun. 10, 2013, 9 pages.

International Preliminary Report on Patentability received for PCT Patent Application No. PCT/SE2010/050997, mailed on Apr. 5, 2012, 8 pages.

Office Action received for Russian Patent Application No. 2012116243/11(024527), mailed on Sep. 11, 2014, 7 pages (3 pages of English Translation and 4 pages of Official Copy).

Russian Office Action mailed Dec. 19, 2014, directed to RU Application No. 2012116243/11(024527); 6 pages.

* cited by examiner

PROTECTIVE DEVICE FOR AN ARTICULATED VEHICLE

CROSS REFERENCE TO RELATED APPLICATIONS

This is a U.S. National Phase patent application of PCT/SE2010/050997, filed Sep. 17, 2010, which claims priority to Swedish Patent Application No. 0950697-3, filed Sep. 24, 2009, each of which is hereby incorporated by reference in the present disclosure in its entirety.

TECHNICAL FIELD

The present invention relates to a protective device for an articulated vehicle comprising at least a first and second vehicle portion; a control gear connected to the respective vehicle portion; and an actuating member for, via the control gear, changing the position of the vehicle portions in relation to one another. The invention also relates to a method for controlling a stiffening means of such a protective device.

BACKGROUND ART

There are articulated tracked vehicles which have a front and rear vehicle portion which are linked together controllably by means of a control gear. The vehicle comprises one or more drive motors, which, via a power transmission, distribute the power from the engine or engines to a respective track of the vehicle.

Document WO-A1-00/35735 shows a control gear for coupling a first and second vehicle portion of an articulated vehicle. The control gear comprises two control links, which are articulately connected to one another by means of a control joint. The control gear further comprises two control cylinders, which have the task of changing the position of two vehicle portions in relation to one another for the purpose of changing the transport direction of the vehicle. The control gear also comprises two hydraulic piston cylinder units, which are configured as combined pressurizable actuating cylinders and hydraulic dampers for damping vertical swinging movements between the vehicle portions during transport and for, where necessary, for example, lifting and angling the vehicle portions upwards in order to pass an obstacle.

When articulated vehicles of the above-stated type are subjected to external influence, such as detonation of a mine, a movement is induced in the vehicle portions. This movement reaches a speed and acceleration which is proportional to the weight of the vehicle portions. When the vehicle is subjected to a detonation, the impact on vehicle and personnel in the vehicle occurs in two phases. The first phase arises when the charge detonates, which lasts for a few milliseconds. Then a pressure wave propagates from the charge and towards the vehicle, whereupon the high pressure from the pressure wave hits the vehicle. The vehicle is deformed by the pressure from the pressure wave and the size of the deformation is dependent on the design and structure of the vehicle and on the distance of the charge from and placement of the charge in relation to the vehicle. The movement of the vehicle during the first phase is small and can amount to just a few mm. However, the vehicle acquires an acceleration and a speed in the direction away from the detonation. Personnel present inside the vehicle can injure body parts which are close to or are in contact with the parts of the vehicle which are deformed. Moreover, a pressure increase which occurs inside the vehicle due to the detonation injures personnel present inside the vehicle.

The second phase is started once the vehicle has gained the initial speed during the high acceleration and the small movement during the detonation phase, and is concluded when the vehicle comes to rest. This phase often involves large movements of the vehicle, which results in the vehicle being able to be thrown several meters. When the vehicle is dislodged, the personnel inside the carriage can be injured.

Since the sizes of the acceleration, speed and movements which are induced in the vehicle in the event of a detonation are proportional to the weight of the vehicle, it is desirable to utilize the whole weight of a vehicle when this is subjected to a detonation. An articulated vehicle does not however make use of the whole of the vehicle weight in a detonation, since the control gear acts as a rotatable link between the vehicle portions.

OBJECT OF THE INVENTION

One object of the present invention is to provide an articulated vehicle having an increased protection for personnel inside the vehicle.

A further object of the invention is to provide an articulated vehicle in which the whole of the vehicle weight is utilized to reduce the impact on vehicle and personnel in the event of a detonation.

DISCLOSURE OF INVENTION

The above-mentioned objects are achieved with a protective device according to patent claim 1 and a method according to patent claim 12.

With such a protective device, the weight of both the front and rear vehicle portion will be utilized whenever the acceleration and/or speed of at least one of the vehicle portions exceeds a predetermined limit value, which happens when the vehicle is subjected to external influence, such as the detonation of a mine. When the relative position of each respective vehicle portion is fixed in relation to one another, the structure of the vehicle becomes stiffer, whereby the movement arising from the detonation is reduced and the impact upon personnel inside the vehicle is lessened.

According to one embodiment of the invention, the stiffening means is a valve coupled to the actuating member by means of a fluid circuit, which valve limits the inflow and outflow of a fluid controlling for the actuating member, so that the actuating member is locked into a rigid or nearly rigid position. When the actuating member is locked into a rigid position, the position of each respective vehicle portion is fixed in relation to one another. The actuating member can be a hydraulic or pneumatic cylinder, which is arranged to control the direction of travel of the vehicle by the inflow and outflow of a fluid controlling for the actuating member in a fluid circuit coupled to the actuating member. The actuating member can also be a hydraulic or pneumatic damper, which is arranged to damp and positionally adjust the vehicle portions in relation to one another by the inflow and outflow of a fluid controlling for the actuating member in a fluid circuit coupled to the actuating member.

According to a further embodiment, the stiffening means is a belt connected between the vehicle portions, which belt is activated into a tensioned state for fixing of the position of each respective vehicle portion in relation to one another. Such a belt is easy to apply between the vehicle portions.

According to another embodiment, the stiffening means is a locking mechanism arranged between the vehicle portions, which locking mechanism is activated into a locked position for fixing of the position of each respective vehicle portion in relation to one another.

The track and the locking mechanism can be activated by a centrifugal clutch whenever the said predetermined limit value is exceeded. Preferably, at least one end of the track is rolled up on a drum, which rotates when a tensile force acts on the track. The centrifugal clutch is arranged on the drum and locks the drum against further rotation whenever the movement of the track, due to the detonation, makes the drum exceed a predetermined rotation speed. Alternatively, the track and the locking mechanism can be activated by a power member whenever the said predetermined limit value is exceeded. The power member can be a hydraulic, pneumatic, electric or powder-gas-controlled actuator, which is activated by a control unit whenever the said predetermined limit value is exceeded. When the power member is activated by the control unit, the track is stretched and the locking mechanism is activated into a locked position for fixing of the position of each respective vehicle portion in relation to one another.

Preferably, a sensor is arranged in at least one of the vehicle portions, which sensor detects the acceleration and/or speed of at least one of the vehicle portions, whereafter the sensor transmits a signal to a control unit coupled to the stiffening means whenever the acceleration and/or speed of at least one of the vehicle portions exceeds a predetermined limit value; and the control unit directs the stiffening means to fix the position of each respective vehicle portion in relation to one another whenever the said predetermined limit value has been exceeded.

BRIEF DESCRIPTION OF DRAWINGS

The invention is described in greater detail below with reference to the appended drawings, which show preferred embodiments of the invention and in which.

DESCRIPTION OF EMBODIMENTS

Figure 1:
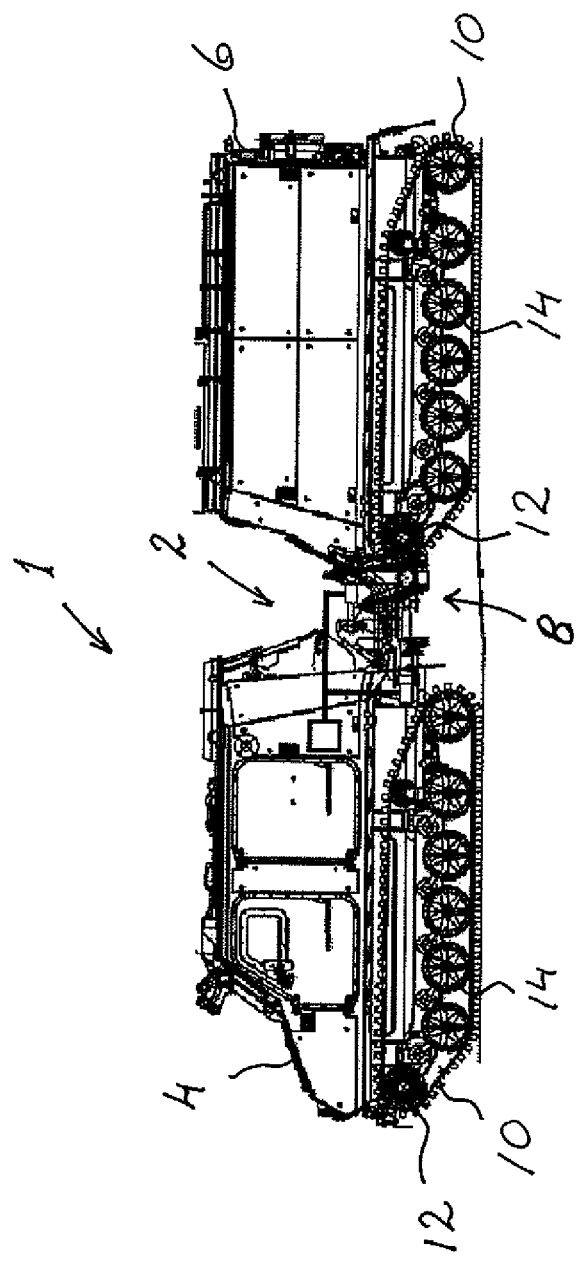
FIG. 1 shows a side view of an articulated vehicle having a protective device according to a first embodiment of the present invention.

FIG. 1 shows a side view of an articulated vehicle 1 having a protective device 2 according to a first embodiment of the present invention. The articulated vehicle 1 has a front and rear vehicle portion 4 and 6, which are linked together controllably by means of a control gear 8. The vehicle 1 shown in FIG. 1 is a tracked vehicle, in which a track 10 comprises drive wheels 12 and carrying wheels 14. The vehicle comprises one or more drive motors (not shown), which, via a transmission (not shown), distribute the power from the drive motor to the respective track 10 of the vehicle 1.

Figure 2:
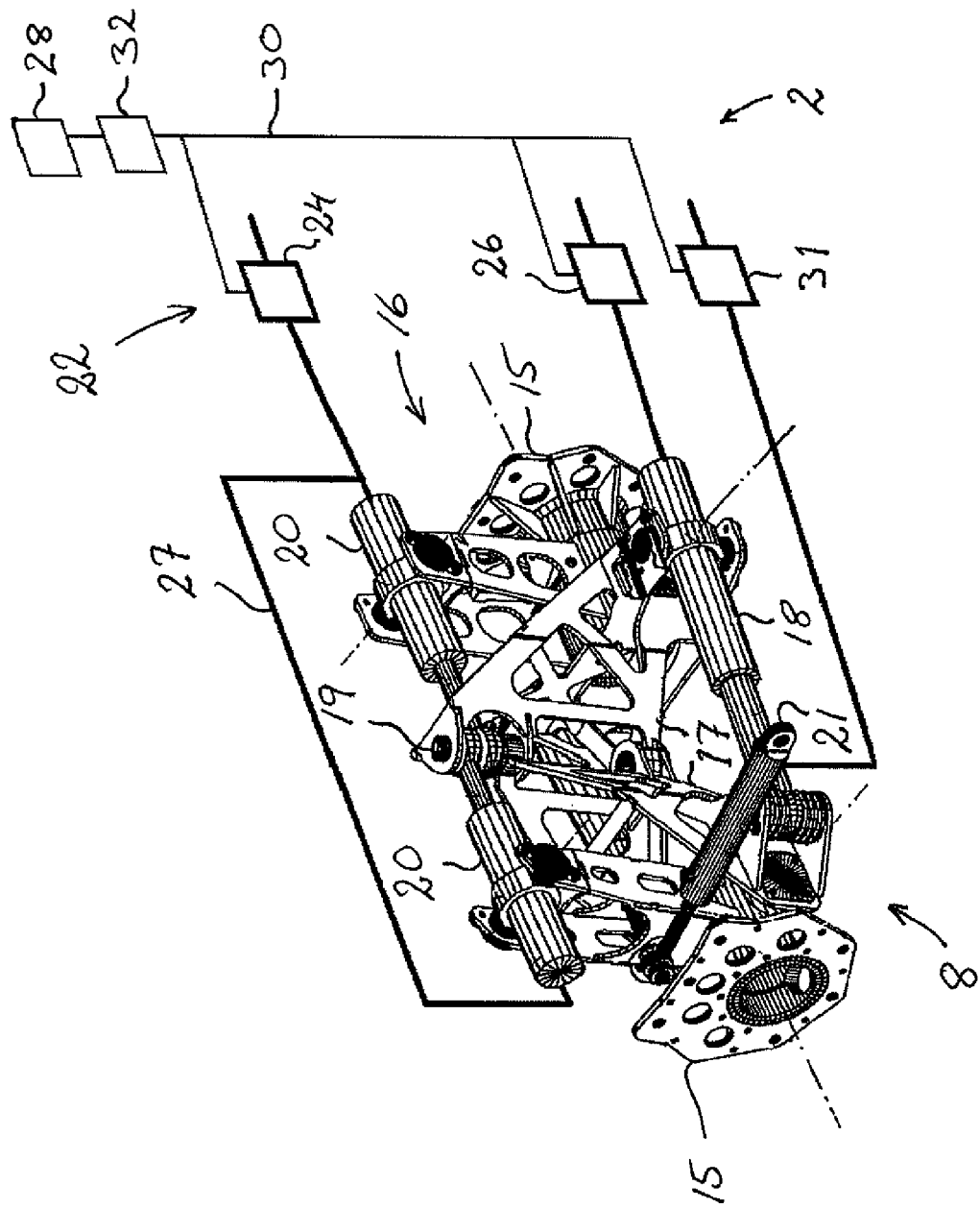
FIG. 2 shows a perspective view of a control gear having a protective device according to a first embodiment of the present invention.

FIG. 2 shows a perspective view of a control gear 8 having a protective device 2 according to a first embodiment of the present invention. The control gear 8 is coupled with the first and second vehicle portion 4, 6 of the articulated vehicle 1 by means of attachment fittings 15 arranged on the control gear 8. The control gear 8 comprises two control links 17, which are articulately connected to one another by means of a control joint 19. The control gear 8 further comprises actuating members 16 in the form of two control cylinders 18, which have the task of changing the position of the vehicle portions 4, 6 in relation to one another for the purpose of changing the transport direction of the vehicle 1. The control gear 8 also comprises actuating members 16 in the form of two hydraulic piston cylinder units, which are configured as combined pressurizable actuating cylinders and hydraulic dampers 20 for damping vertical swinging movements between the vehicle portions 4, 6 during transport and for, where necessary, being able to angle the vehicle portions 4, 6 in relation to one another in order to pass an obstacle, for example. The control gear 8 also comprises an actuating member 16 in the form of a damping cylinder 21, for damping rotary motions about the longitudinal axis of the vehicle 1.

The protective device 2 comprises at least one stiffening means 22, which fixes the relative position of each respective vehicle portion 4, 6 in relation to one another whenever the acceleration and/or speed of at least one of the vehicle portions 4, 6 exceeds a predetermined limit value.

Figure 3:
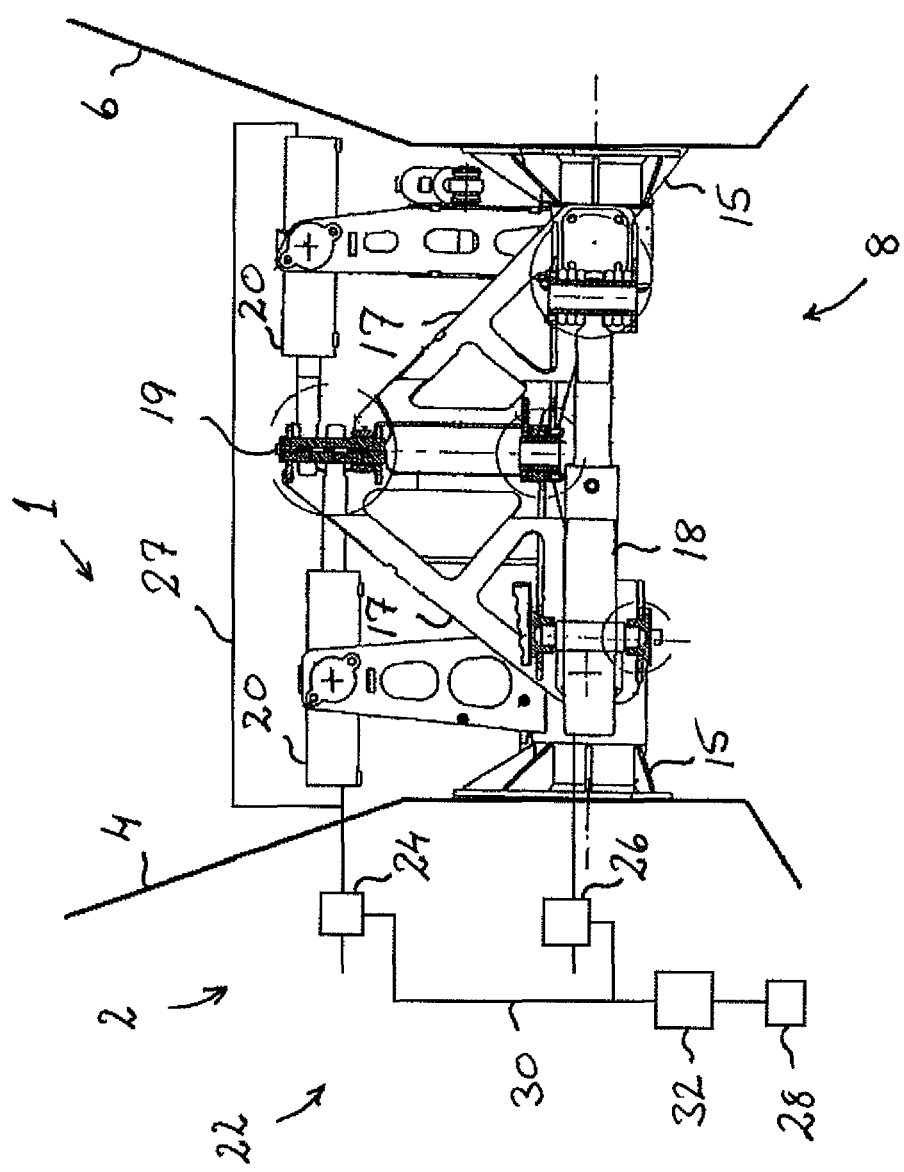
FIG. 3 shows a side view of the control gear according to FIG. 2.

The protective device 2 is also evident from FIG. 3, which shows a side view of the control gear 8 according to FIG. 2 and in which the control gear 8 is connected to the front and rear vehicle portion 4, 6. According to the first embodiment of the invention, which can be seen from FIGS. 2 and 3, the stiffening means 22 is constituted by valves 24, 26, 31, which are coupled to the respective actuating member 16 by means of a fluid circuit 27. Whenever the acceleration and/or speed of at least one of the vehicle portions 4, 6 exceeds a predetermined limit value, the valves 24, 25 will limit inflow and outflow of a fluid 29 controlling for the actuating member 16, so that the actuating member 16 is locked into a rigid position. When the actuating member 16 is locked into a rigid position, the control gear 8 will be fixed such that the vehicle portions 4, 6 are fixed into a rigid position in relation to one another. In this position, the control gear 8 can thus absorb torque without any relative displacement of the components belonging to the control gear. Such a situation arises if, for example, a charge, such as a mine, detonates close to the vehicle 1. The actuating member 16 can be hydraulically or pneumatically controlled.

Preferably, a sensor 28 is arranged in at least one of the vehicle portions 4, 6, which sensor 28 detects the acceleration and/or speed and transmits a signal, via a signal line 30, to a control unit 32 coupled to the stiffening means 22 whenever the said predetermined limit value has been exceeded. Via a signal line 30, the control unit 32 directs the stiffening means 22 to fix the respective vehicle portion 4, 6 whenever the said predetermined limit value has been exceeded.

Figure 4:
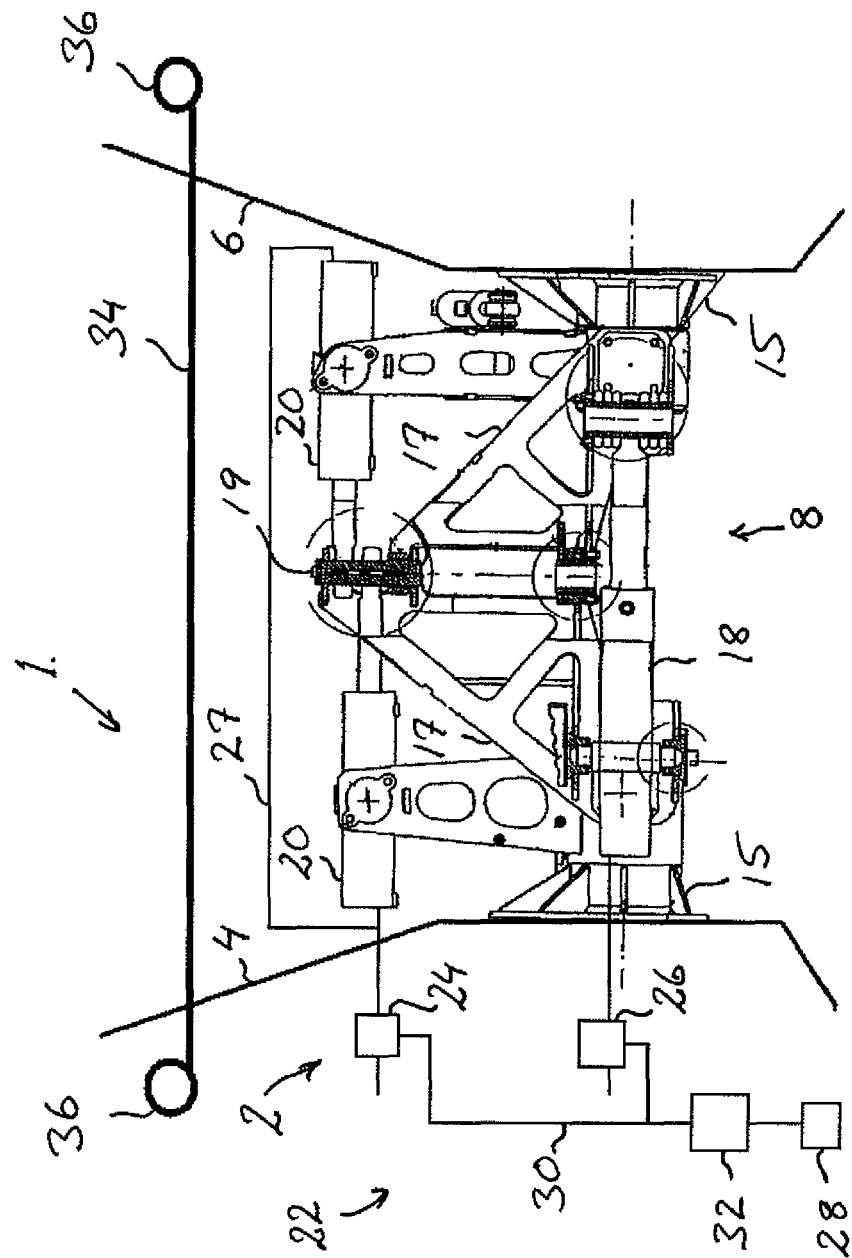
FIG. 4 shows a side view of a control gear having a protective device according to a second embodiment of the present invention.

FIG. 4 shows a side view of a control gear 8 having a protective device 2 according to a second embodiment of the present invention. According to this second embodiment, the stiffening means 22 is constituted by a belt 34 connected between the vehicle portions 4, 6, which belt is activated into a tensioned state for fixing of the position of each respective vehicle portion 4, 6 in relation to one another. The belt 34 can be activated by a centrifugal clutch 36 whenever the said predetermined limit value has been exceeded.

Figure 5:
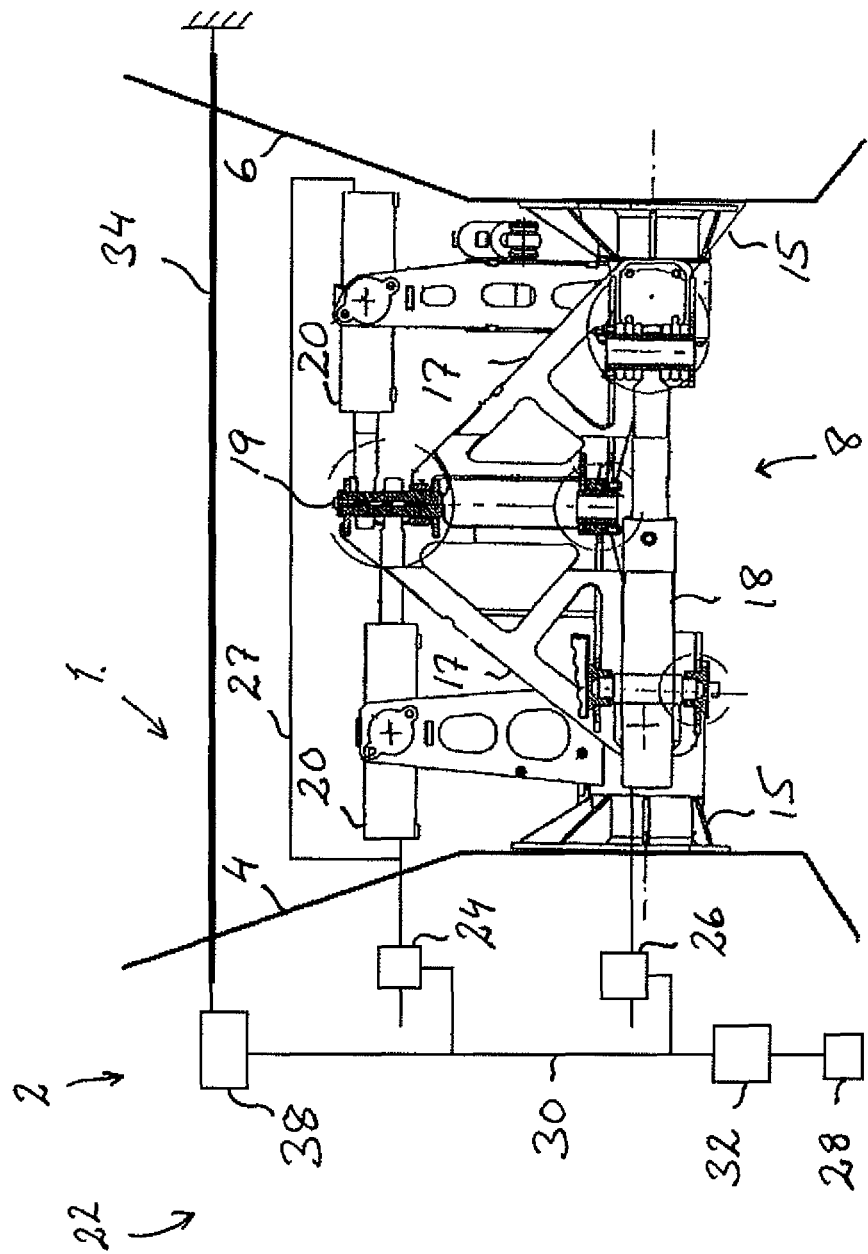
FIG. 5 shows a side view of the control gear according to FIG. 4, but having a power member which activates the protective device.

Alternatively, the belt 34, as shown in FIG. 5, can be activated by a power member 38, such as a hydraulic, pneumatic, electric or powder-gas controlled actuator, whenever the said predetermined limit value is exceeded. When the power member 38 is activated by the control unit 32, the belt 34 is stretched, so that the position of each respective vehicle portion 4, 6 is fixed in relation to one another.

Figure 6:
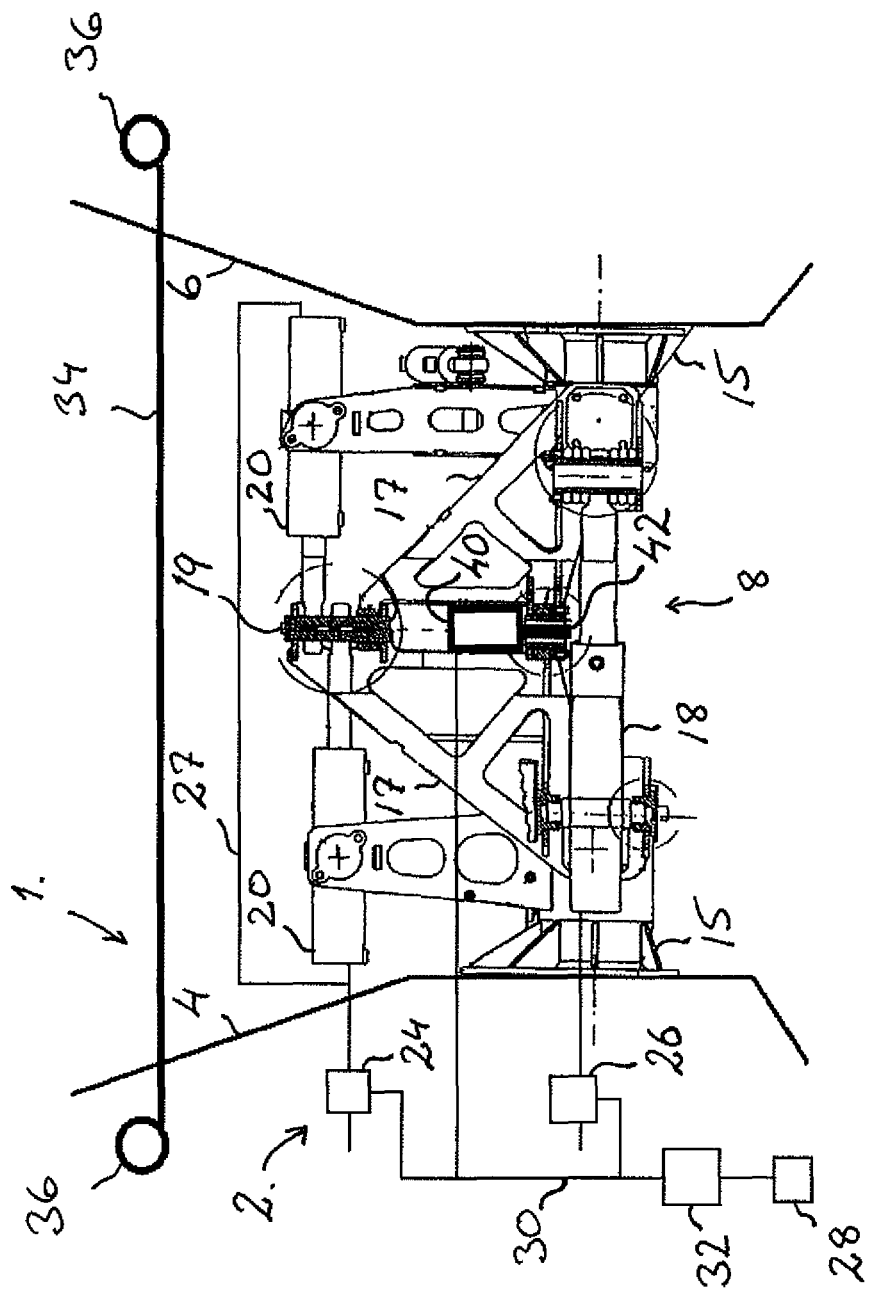
FIG. 6 shows a side view of a control gear having a protective device according to a third embodiment of the present invention.

FIG. 6 shows a side view of a control gear 8 having a protective device 2 according to a third embodiment of the present invention. According to this third embodiment, the stiffening means 22 is a locking mechanism 40 arranged between the vehicle portions 2, 6, which locking mechanism is activated into a locked position for fixing of the relative position of each respective vehicle portion 4, 6. The locking mechanism 40 can be activated by a centrifugal clutch 36 whenever the said predetermined limit value is exceeded, or activated by a power member 38, such as a hydraulic, pneumatic, electric or powder-gas-controlled actuator, whenever the said predetermined limit value is exceeded. For example, the locking mechanism 40 can configured as a multiple disc clutch 42, which locks the parts of the control gear 8 in relation to one another.

Figure 7:
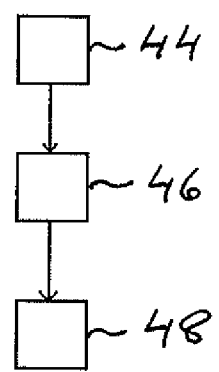
FIG. 7 shows a flow chart for controlling a stiffening means of a protective device according to the present invention.

FIG. 7 shows a flow chart for the control of a stiffening means 22 of a protective device 2 according to the present invention. The method for controlling the stiffening means 22 of the protective device 2 is conducted according to the following steps. In a first step 44, the sensor 28 detects the acceleration and/or speed of at least one of the vehicle portions 4, 6. In a second step 46, the sensor 28 transmits a signal to the control unit 32 whenever the acceleration and/or speed of at least one of the vehicle portions 4, 6 exceeds a predetermined limit value. In a third step 48, the control unit 32 directs the stiffening means 22 to fix the position of each respective vehicle section 4, 6 in relation to one another whenever the said predetermined limit value has been exceeded.

The various embodiments which are described above can be mutually combined and used simultaneously on one and the same vehicle 1. Such a combination gives rise to a redundant protective device.

The invention claimed is:

1. A protective device for an articulated vehicle comprising:
    at least front and rear vehicle portions;
    a control gear connected to the respective vehicle portions configured to allow a non-horizontal movement of the vehicle portions relative to each other;
    an actuating member for, via the control gear, changing the relative position of the vehicle portions in relation to one another; and
    at least one stiffening member, which fixes the position of each respective vehicle portion into a rigid position in relation to one another so that weights of both the front and rear vehicle portions are utilized so as to prohibit the non-horizontal movement of the vehicle portions and so that the control gear absorbs torque without any relative displacement of components belonging to the control gear, whenever the acceleration and/or speed of at least one of the vehicle portions exceeds a predetermined limit value, which happens when the vehicle is subjected to detonation of a mine.

2. A protective device according to claim 1, characterized in that the stiffening member is a valve coupled to the actuating member by means of a fluid circuit, which valve limits the inflow and outflow of a fluid controlling for the actuating member, so that the actuating member is locked into a rigid position.

3. A protective device according to claim 1, characterized in that the actuating member is a hydraulic or pneumatic cylinder, which is arranged to control the direction of travel of the vehicle by the inflow and outflow of a fluid controlling for the actuating member in a fluid circuit coupled to the actuating member.

4. A protective device according to claim 1, characterized in that the actuating member is a hydraulic or pneumatic damper, which is arranged to damp and positionally adjust the vehicle portions in relation to one another by the inflow and outflow of a fluid controlling for the actuating member in a fluid circuit coupled to the actuating member.

5. A protective device according to claim 1, characterized in that the stiffening member is a belt connected between the vehicle portions, which belt is activated into a tensioned state for fixing of the position of each respective vehicle portion in relation to one another.

6. A protective device according to claim 1, characterized in that the stiffening member is a locking mechanism arranged between the vehicle portions, which locking mechanism is activated into a locked position for fixing of the position of each respective vehicle portion in relation to one another.

7. A protective device according to claim 5, characterized in that the stiffening member is activated by a centrifugal clutch whenever the said predetermined limit value is exceeded.

8. A protective device according to claim 5, characterized in that the stiffening member is activated by a power member whenever the said predetermined limit value is exceeded.

9. A protective device according to claim 8, characterized in that the power member is a hydraulic, pneumatic, electric or powder-gas-controlled actuator.

10. A protective device according to claim 1, characterized in that a sensor is arranged in at least one of the vehicle portions, which sensor detects the acceleration and/or speed and transmits a signal to a control unit coupled to the stiffening member whenever the said predetermined limit value has been exceeded.

11. A protective device according to claim 10, characterized in that the control unit directs the stiffening member to fix the respective vehicle portion whenever the said predetermined limit value has been exceeded.

12. A protective device according to claim 2, characterized in that the valve, a belt and a locking mechanism simultaneously fix the position of each respective vehicle portion in relation to one another whenever the acceleration and/or speed of at least one of the vehicle portions exceeds a predetermined limit value.

13. A method for controlling a stiffening member of a protective device for an articulated vehicle according to claim 1, comprising detecting the acceleration and/or speed of at least one of the vehicle portions; transmitting a signal to a control unit coupled to the stiffening member whenever the acceleration and/or speed of at least one of the vehicle portions exceeds a predetermined limit value; and directing the stiffening member to fix the position of each respective vehicle portion into a rigid position in relation to one another whenever the said predetermined limit value has been exceeded.

14. A protective device according to claim 1, wherein the front portion is a cabin and rear portion is a trailer.

15. A protective device according to claim 1, wherein the control gear allows for movement between the front and rear vehicle portions in at least two axes.

16. A protective device according to claim 1, wherein changing the relative position of the vehicle portions in relation to one another changes the transport direction of the vehicle.

\* \* \* \* \*